(12) United States Patent
Bellingrath

(10) Patent No.: US 8,502,711 B2
(45) Date of Patent: Aug. 6, 2013

(54) SWAP TOLERANT CODING AND DECODING CIRCUITS AND METHODS

(75) Inventor: Thomas Bellingrath, Nuremberg (DE)

(73) Assignee: Cisco Technology, Inc., San Jose, CA (US)

( * ) Notice: Subject to any disclaimer, the term of this patent is extended or adjusted under 35 U.S.C. 154(b) by 68 days.

(21) Appl. No.: 13/266,138

(22) PCT Filed: May 3, 2010

(86) PCT No.: PCT/EP2010/055978
§ 371 (c)(1),
(2), (4) Date: Oct. 25, 2011

(87) PCT Pub. No.: WO2010/130595
PCT Pub. Date: Nov. 18, 2010

(65) Prior Publication Data
US 2012/0044098 A1    Feb. 23, 2012

(30) Foreign Application Priority Data
May 12, 2009 (EP) .................................. 09160058

(51) Int. Cl.
*H03M 13/00* (2006.01)
(52) U.S. Cl.
USPC ............................................. 341/94; 714/758
(58) Field of Classification Search
USPC ................................ 341/93, 94; 714/758, 799
See application file for complete search history.

(56) References Cited

U.S. PATENT DOCUMENTS

| 4,092,491 | A | 5/1978 | Frazer | |
|---|---|---|---|---|
| 5,025,455 | A | 6/1991 | Nguyen | |
| 7,467,335 | B2* | 12/2008 | Otto et al. | 714/700 |
| 8,122,334 | B2* | 2/2012 | Lee et al. | 714/801 |
| 8,312,343 | B2* | 11/2012 | Zhong et al. | 714/752 |
| 2008/0253761 | A1 | 10/2008 | Mizuguchi et al. | |

OTHER PUBLICATIONS

International Search Report dated Jun. 6, 2010 in corresponding PCT/EP2010/055978.
International Preliminary Report on Patentability and Written Opinion in counterpart International Application No. PCT/EP2010/055978, mailed Nov. 24, 2011.

\* cited by examiner

*Primary Examiner* — Brian Young

(57) ABSTRACT

This invention relates to a coding circuit for generating a swap tolerant code. The coding circuit comprises a first and second input (540, 541), an odd parity pair detector (535), a memory (533), and an output circuit (536, 537, 551; 736, 737, 751). Each of the first and second inputs (540, 541) receive a stream of serial data. The odd parity pair detector (535) outputs an odd parity pair signal if the bits received at said first and second inputs (540, 541) have different logical values and therefore constitute an odd parity pair. The memory (533) stores information on a previous odd parity pair. The output circuit outputs the previous odd parity pair, if said first input (540) provides a logical 1 and said second input (541) provides a logical 0. The output circuit outputs the inverted previous odd parity pair, if said first input (540) provides a logical 0 and said second input (541) provides a logical 1. The invention further provides a corresponding decoding circuit, and coding and decoding methods. Further the invention relates to a coding circuit for inversion tolerant coding, a corresponding decoding circuit and coding and decoding methods.

13 Claims, 7 Drawing Sheets

| Original Data | | Even Parity Pairs | | Odd Parity Pairs $OPP_{in}$ | | Coded Odd Parity pairs COPP | | Coded Data | |
|---|---|---|---|---|---|---|---|---|---|
| I | Q | I | Q | I | Q | I | Q | I | Q |
|   |   |   |   |   |   | 1 | 0 |   |   |
| 1 | 0 |   |   | 1 | 0 | 1 | 0 | 1 | 0 |
| 1 | 0 |   |   | 1 | 0 | 1 | 0 | 1 | 0 |
| 1 | 0 |   |   | 1 | 0 | 1 | 0 | 1 | 0 |
| 0 | 1 |   |   | 0 | 1 | 0 | 1 | 0 | 1 |
| 1 | 1 | 1 | 1 |   |   |   |   | 1 | 1 |
| 1 | 1 | 1 | 1 |   |   |   |   | 1 | 1 |
| 0 | 1 |   |   | 0 | 1 | 1 | 0 | 1 | 0 |
| 0 | 0 | 0 | 0 |   |   |   |   | 0 | 0 |
| 0 | 0 | 0 | 0 |   |   |   |   | 0 | 0 |
| 1 | 1 | 1 | 1 |   |   |   |   | 1 | 1 |
| 1 | 0 |   |   | 1 | 0 | 1 | 0 | 1 | 0 |
| 0 | 0 | 0 | 0 |   |   |   |   | 0 | 0 |
| 1 | 0 |   |   | 1 | 0 | 1 | 0 | 1 | 0 |
| 0 | 1 |   |   | 0 | 1 | 0 | 1 | 0 | 1 |
| 0 | 0 | 0 | 0 |   |   |   |   | 0 | 0 |
| 1 | 1 | 1 | 1 |   |   |   |   | 1 | 1 | last COPP ↗ (pointing to the first COPP entry 1,0)

$$COPP_n = \begin{cases} \text{if } OPP_{in} = (1,0) : COPP_{n-1} \\ \text{if } OPP_{in} = (0,1) : \text{Inverted of } COPP_{n-1} \end{cases}$$

Fig. 2

| Received Data | | Even Parity pairs | | Received Odd Parity Pairs | | Decoded Odd Parity Pairs | | Restored Data | |
|---|---|---|---|---|---|---|---|---|---|
| | | | | COPP | | OPP | | OPP | |
| A | B | A=I | B=Q | A | B | I | Q | I | Q |
| 1 | 0 | | | 1 | 0 | ? | ? | ? | ? |
| 1 | 0 | | | 1 | 0 | 1 | 0 | 1 | 0 |
| 1 | 0 | | | 1 | 0 | 1 | 0 | 1 | 0 |
| 0 | 1 | | | 0 | 1 | 0 | 1 | 0 | 1 |
| 1 | 1 | 1 | 1 | | | | | 1 | 1 |
| 1 | 1 | 1 | 1 | | | | | 1 | 1 |
| 1 | 0 | | | 1 | 0 | 0 | 1 | 0 | 1 |
| 0 | 0 | 0 | 0 | | | | | 0 | 0 |
| 0 | 0 | 0 | 0 | | | | | 0 | 0 |
| 1 | 1 | 1 | 1 | | | | | 1 | 1 |
| 1 | 0 | | | 1 | 0 | 1 | 0 | 1 | 0 |
| 0 | 0 | 0 | 0 | | | | | 0 | 0 |
| 1 | 0 | | | 1 | 0 | 1 | 0 | 1 | 0 |
| 0 | 1 | | | 0 | 1 | 0 | 1 | 0 | 1 |
| 0 | 0 | 0 | 0 | | | | | 0 | 0 |
| 1 | 1 | 1 | 1 | | | | | 1 | 1 |

$$OPP = \begin{cases} \text{if } COPP_n = COPP_{n-1} : (1,0) \\ \text{if } COPP_n \neq COPP_{n-1} : (0,1) \end{cases}$$

Fig. 3

SWAP TOLERANT CODING AND DECODING CIRCUITS AND METHODS

The invention generally relates to the field of data coding for optical data transmission. The invention more specifically relates to coding and decoding for high-speed optical data transmission using (D)QPSK modulation.

One of the problems faced in high-speed optical data transmission is inter symbol interference (ISI). A single-bit has a length of approximately 2 cm in a 10 Gb/s system using amplitude shift keying (ASK) also called on/off keying (OOK) in an optical fiber having a refractive index of 1.5. Due to impairments of the optical transmission path such as polarisation mode dispersion (PMD) and chromatic dispersion (CD) bits of neighboring time slots overlap. As a consequence the energy of a single bit has to be recovered not only from a single time slot, but from a small number, e.g. 3, of successive time slots. This is referred to as equalization.

The better the equalization works, the longer optical links may be at a given transmission rate and modulation scheme without digitally refreshing the signal. Alternatively, a better equalization technology may enable a higher transmission rate when the other parameters are fixed. A premium equalization technology is a maximum likelihood sequence estimator (MLSE) which is described e.g. in WO 2005/011220 A1 in the context of optical data transmission.

Another approach is to encode more than one bit into a single symbol, which is referred to multi-level signaling (cf. Peter J. Winzer, René-Jean Essiambre: "Advanced Optical Modulation Formats", Proceedings of the IEEE, Vol. 94, No. 5, Mai 2006, p. 952-985, later referred to as Winzer06). This means that the symbol rate is smaller than the bit rate. In other words: multi-level signaling offers the benefits of higher spectral efficiencies. This is sometimes, but not always at the cost of a reduced tolerance to noise. Due to the increased length of each symbol in a multi-level signaling system, the ISI is reduced at a given data transmission rate and physical properties of the transmission channel.

Differential quadrature phase shift keying (DQPSK) has recently received appreciable attention in optical communications research (cf e.g. PCT/EP2009/052515). It transmits one out of four phase shifts $\{0, \pi/2, -\pi/2, \pi\}$ at a symbol rate of half the aggregate bit rate, i.e. each symbol encodes two bits. For the modulation Mach-Zehnder interferometers are used. For the demodulation and differential decoding, which is done in a single step in the optical domain, delay interferometers (DIs) are used which are similar to Mach-Zehnder interferometers. However, it is difficult to determine to which data stream the two delay interferometers are tuned. To achieve this, test sequences may be inserted at the transmitter side and detected at the receiver side. The sonet framing may be considered as such a test sequence.

A different technical field is data transmission to and from satellites and orbiters, in particular ones for deep space missions. Doppler in such communications systems creates phase and frequency shifts. To this end multiple differential phase-shift-keyed (MDPSK) modulation formats (et e.g. U.S. Pat. No. 5,007,068), more specifically double differential multiple phase shift keying (DDMPSK), double differential binary phase shift keying (DDBPSK) and double differential quadrature phase shift keying (DDQPSK) are used, since double differential modulation formats are insensitive to phase and frequency shifts. For more information see "SER Expressions for Double Differential Modulation" by M. R. Bhatnagar and A. Hjorungnes, 1-4244-1200-5/07, 2007 IEEE and "Symbol Recovery Circuit design for deep-space MARS receiver using 501 technology", Master of Science theses by Bhaskar Bharath, North Carolina State University.

It is the object of this invention to provide coding and decoding circuits and methods which simplify the frequency and phase tuning on the receiver side.

This object is achieved by the subject matter of the independent claims.

Preferred embodiments of the invention are the subject matters of the dependent claims.

It is an advantage of the inventive solution that it does not require a test sequence.

It is a further advantage of the inventive solution that any pair of independent tuning stops of the delay interferometers can be used in DQPSK. Further, advantageously, a communication channel consisting of two subchannels that can be independently inverted or swapped can be corrected for such swaps and/or inversions without increasing the line rate for the coding.

In the following preferred embodiments of this invention are described referring to the accompanying drawings. In the drawings:

FIG. 2 shows a table illustrating inventive swap-insensitive line coding;

FIG. 3 shows a table illustrating inventive swap-insensitive line decoding;

Figure 1:
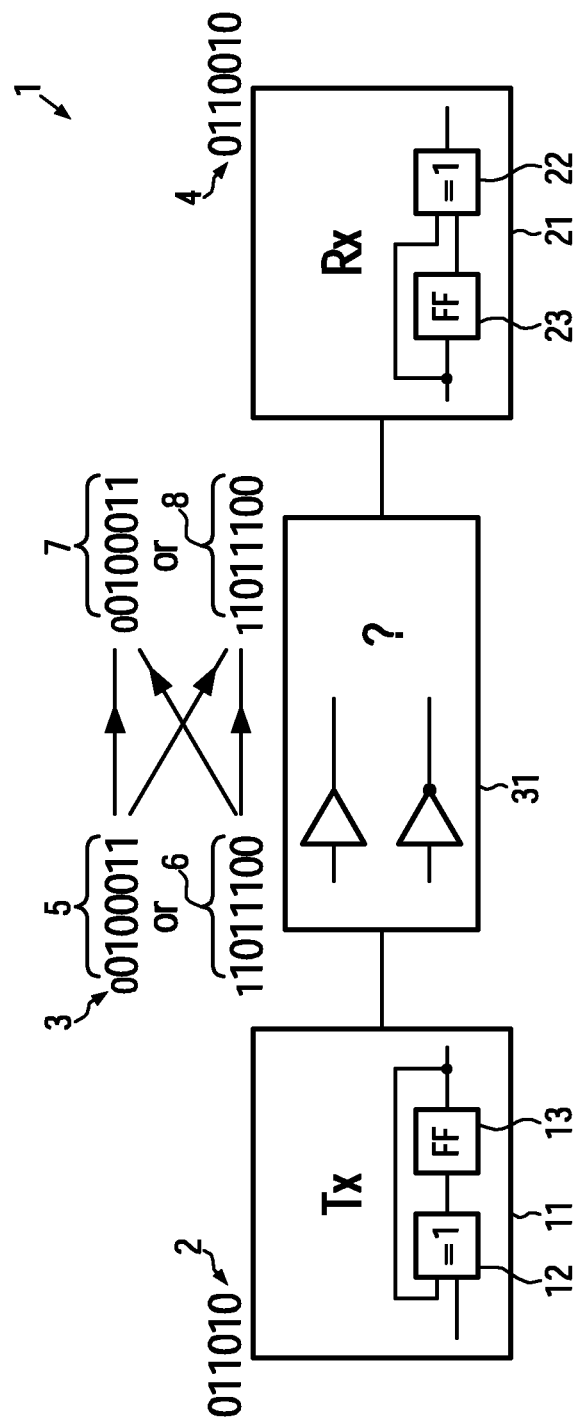
FIG. 1 shows an inventive embodiment of an invert-insensitive line coding and decoding.

FIG. 1 illustrates inventive invert-insensitive system 1. A data sequence 2 equivalent to a stream of serial data which is to be transmitted is encoded by a transmitter 11, transmitted by a transmission path 31 to a receiver 21 which recovers the data sequence 4 equivalent to a stream of decoded serial data. We assume that we do not know as to whether the transmission path 31 inverts or does not invert the transmitted data.

The transmitter comprises a coder which consists of an exclusive-or gate (in the following XOR gate) 12 and a flip-flop 13. The output of the flip-flop is fed back to one input of the XOR gate 12. The other input of the XOR gate 12 receives the data sequence 2, which is to be transmitted. From another point of view, a flip-flop is a one-bit memory. In addition, the flip-flop receives a clock (not shown) which has a frequency and phase equivalent to the data rate. Therefore, the flip-flop 13 acts as a delay of one bit duration. Depending on the state 3 of the flip-flop 13 before the data sequence 2 is encoded by the transmitter 11, the encoder outputs either the data sequence 5 or the inverted data sequence 6. As will be explained in connection with FIG. 5, an encoded sequence may also be tapped at the output of the XOR gate 12.

Depending on the transmission path property either the data sequence 7 or the inverted data sequence 8 is received by the receiver 21.

The receiver 21 comprises a decoder which may consist of a flip-flop 23 and an XOR gate 22. Similarly as in the coder, the flip-flop 23 receives the recovered clock (not shown) of the received data. Therefore, also flip-flop 23 delays the received data by one bit duration. The XOR gate 22 XORs the received data and the data output by the flip-flop 23.

FIG. 2 shows a table illustrating inventive swap-insensitive line coding. For DQPSK typically a pair of successive bits within the original data are encoded into a symbol, which may be represented by one out of four different phase shifts in DQPSK, and transmitted in parallel during a symbol period. The bit pairs are shown in FIG. 2 in pairs of neighbouring columns.

The coding of bits into DQPSK is often done in a way that an in-phase (I) bit causes a phase shift of 0 or π and a quadrature (Q) bit causes a phase shift of −π/2 or −π/2. The resulting phase shift is obtained by adding the phase shifts of the in-phase and quadrature bits of a bit pair. The stream of in-phase bits is designated as in-phase channel and the stream of quadrature bits is designated as quadrature channel.

In FIG. 2 the left column of a pair of columns comprises the in-phase bits and the right column of this pair of columns comprises the quadrature bits. The respective columns are headlined by I and Q. The original data are comprised in the two leftmost columns.

In the columns headlined "Even Parity Pairs" bit pairs which comprise two 0s or two 1s are listed. Even parity pairs are copied to the coded data into the two rightmost columns without change.

In the column headlined "odd parity pairs" bit pairs which comprise one 0 and one 1 are listed. The quadrature bits are encoded by a similar encoding method as explained in connection with FIG. 1. The encoded in-phase bits are equivalent to the inverted encoded quadrature bits. Consequently, odd parity pairs result in coded odd parity pairs. The coded odd parity pairs are also listed in the respective rows of the two rightmost columns.

The equation at the bottom of FIG. 2 summarizes the coding method for the odd parity pairs (OPP) in a different, but equivalent form: if the $n^{th}$ odd parity pair to be encoded is equivalent to (1, 0), the $n^{th}$ coded odd parity pair (COPP) is equivalent the previous, $(n-1)^{th}$ coded odd parity pair. If the $n^{th}$ odd parity pair is equivalent to (0, 1), the $n^{th}$ coded odd parity pair (COPP) is equivalent the inverted, previous, $(n-1)^{th}$ coded odd parity pair.

Since there are only two kinds of odd parity pairs, an odd parity pair can be stored in a one-bit memory which may be implemented by a flip-flop.

FIG. 3 shows a table illustrating inventive swap-insensitive line decoding. The even parity pairs are copied from the received data to the restored data without any change. For illustrating the separating step between even and odd parity pairs, the even and odd parity pairs are additionally listed in the columns headlined "Even Parity Pairs" and "Received Odd Parity Pairs", respectively. The received odd parity pairs are equivalent to the coded odd parity pairs (COPP) in FIG. 2, but each of the three columns "A" may be swapped with the neighboring column out of the three columns "B" without affecting the decoded data.

In the column pairs headlined "Received Data" and "Received Odd Parity Pairs" it is not yet known which one of the two columns shows the in-phase and quadrature bits. Therefore the columns are headlined by "A" and "B". This is also the case for the column pair headlined "Even Parity Pairs". However, the bits of an even parity pair are equal, by definition. Consequently, it makes no difference as to whether column A is assigned to the in-phase or quadrature channel. The same applies to column B. In the column pair "Even Parity Pairs" the column A is assigned to the in-phase channel and the column B is assigned to the quadrature channel. Therefore, the two columns are headlined "A=I" and "B=Q", respectively.

The quadrature bits listed in the right column of the column pair for the received odd parity pairs are decoded in a similar fashion as explained in connection with FIG. 1. The in-phase decoded odd parity pair bits are just the inverted decoded quadrature odd parity pair bits such that received odd parity pairs result in odd parity pairs after the decoding. The question marks in the topmost data row of the columns headlined "Decoded Odd Parity Pairs" and "Restored Data" indicate that proper decoding can only start after the first received odd parity pair.

The equation at the bottom of FIG. 3 summarizes the decoding method for the odd parity pairs in a different, but equivalent form: if the $n^{th}$ coded odd parity pair $COPP_n$ and the $(n-1)^{th}$ coded odd parity pair $COPP_{n-1}$ are equal, the restored odd parity pair is equal to (1, 0), and (0, 1) otherwise.

Figure 4:
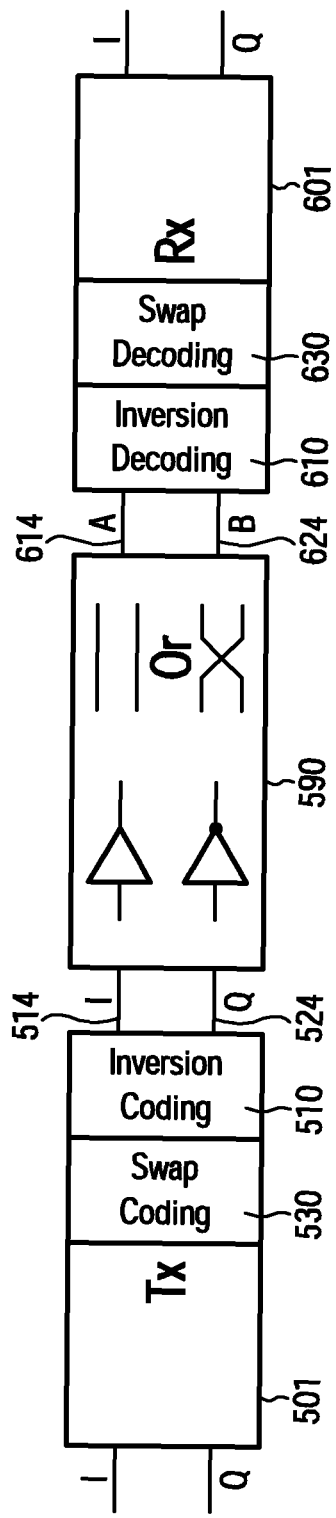
FIG. 4 shows a block diagram for nesting swap and invert-insensitive line coding and decoding.

FIG. 4 shows a block diagram for nesting swap and invert-insensitive line coding and decoding. Such a nesting is helpful, for example, if two bit streams are transmitted, each of which may or may not be inverted and the lines for the two bit streams may or may not be crossed over. Such a problem arises when for example (D)QPSK is used in optical data transmission. As is explained in PCT/EP2009/052515, which is incorporated herein by reference, two delay interferometers (DI), one for the in-phase and the other one for the quadrature channel, are used to convert the differential phase modulation into an intensity modulation. It is more complicated to tune one DI to the in-phase channel and the other DI to the quadrature channel. It is much easier to tune one DI to a channel out of the in-phase, inverted in-phase, quadrature and inverted quadrature channel and to tune the second DI to one out of the two remaining channels which are independent from the channel to which the first DI is tuned to. Together with the DQPSK Transmitter, which comprises a precoder, and the optical link this "careless" tuning scheme may be illustrated by a transmission channel 590, which either inverts or does not invert both, the in-phase and quadrature channels and may or may not swap the in-phase and quadrature channel. Therefore, the outputs of the transmission channel 590 are designated A and B. Since, on the other hand, the two inputs of the transmitter and the two outputs of the receiver can be used in place of an ideal DQPSK channel with known configuration, such inputs and outputs are designated with I and Q.

As can be learned from the block diagram in FIG. 4, the outer code is the swap-insensitive line coding, which is done in swap coder 530 within transmitter 501. The respective decoding is done in swap decoder 630 within receiver 601. The inversion coding is the inner code, which is done in inversion coder 510. The inversion decoding is done in inversion decoder 610.

Figure 5:
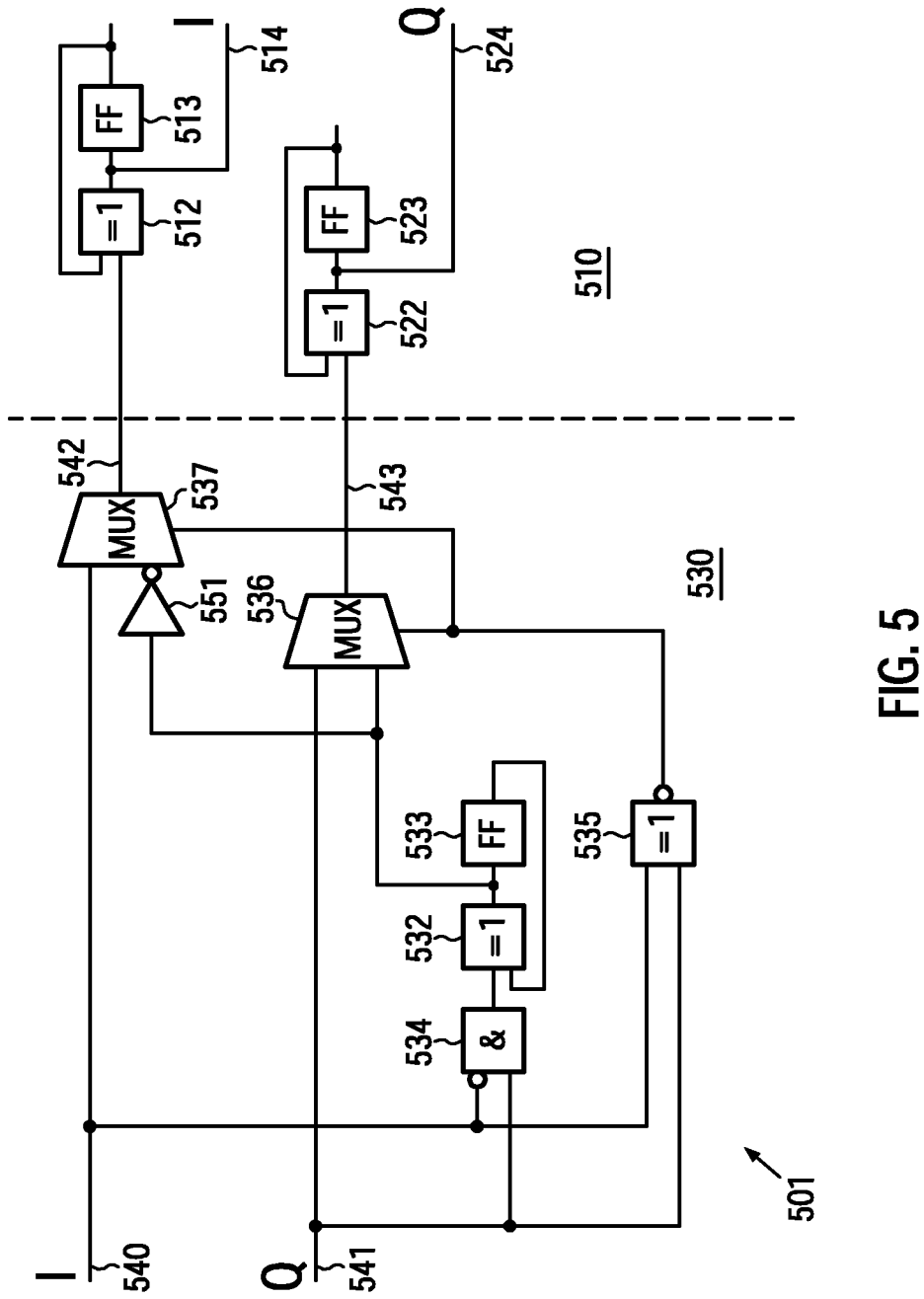
FIG. 5 shows a block diagram of a nested swap and invert-insensitive line coder.

An embodiment of the swap coder 530 and the inversion coder 510 is illustrated in FIG. 5 in more detail. The swap coder 530 comprises an AND gate 534, two XOR gates 532 and 535, a flip-flop 533, two multiplexers 536 and 537, an inverter 551 an in-phase input 540, an in-phase node 542, a quadrature input 541 and a quadrature node 543. The swap coder 530 implements the swap coding method explained in connection with FIG. 2. Inversions are illustrated by open circles at an input or output of a circuit element.

The XOR gate 535 detects odd and even parity pairs. Since the output of XOR gate 535 is inverted, a logical 1 at the output of XOR gate 535 designates an even parity pair and makes the multiplexers 536 and 537 select their upper inputs. So the swap coder 530 directly outputs even parity pairs.

The AND gate 534 outputs a logical 1 only, if the quadrature input 541 provides a logical 1 and the in-phase input 540 provides a logical 0, since the in-phase input is inverted at the respective input of AND gate 534. In this case, the XOR gate 532 inverts the previous quadrature bit, which is stored in flip-flop 533. So the flip-flop 533 is kind of a memory. The output of XOR gate 532 is output at the quadrature node 543 by multiplexer of 536 and the inverted output of XOR gate 532 is output at the in-phase node 542 by inverter 551 and multiplexer 537. Finally, the output of XOR gate 532 is stored in the flip-flop 533 for the next clock cycle.

If the in-phase input 540 provides a logical 1 and the quadrature input 541 provides a logical 0, i.e. the inputs provide the other odd parity pair, the output of AND gate 534 provides a logical 0. In this case, the XOR gate 532 outputs the previous quadrature bit stored in flip-flop 533. So the previous quadrature bit is forwarded to quadrature node 543 by multiplexer 536 and the inverted previous quadrature bit is forwarded to in-phase node 542 by multiplexer 537 and inverter 551. The flip-flop 533 does not change its status, because it inputs its output.

If the inputs provide an even parity pair, the output of AND gate 534 also provides a logical 0. As mentioned in the previous paragraph, the flip-flop 533 does not change its status, since the XOR gate 532 forwards the output of flip-flop 533 to its input. Consequently, while one or more even parity pairs are processed, the quadrature bit of the odd parity pair before the even parity pairs is stored in the flip-flop 533 until the next odd parity pair is to be processed.

The inversion coder 510 comprises two individual coders. The coder for the in-phase channel comprises an XOR gate 512 and a flip-flop 513. The other coder for the quadrature channel comprises an XOR gate 522 and a flip-flop 523. Each of the individual coders is similar to the coder within transmitter 11 shown in FIG. 1. The difference is that the output of the XOR gates 512 and 522, rather than the outputs of the flip-flops 513 and 523 are forwarded as an in-phase output 514 and a quadrature output 524, respectively.

Figure 6:
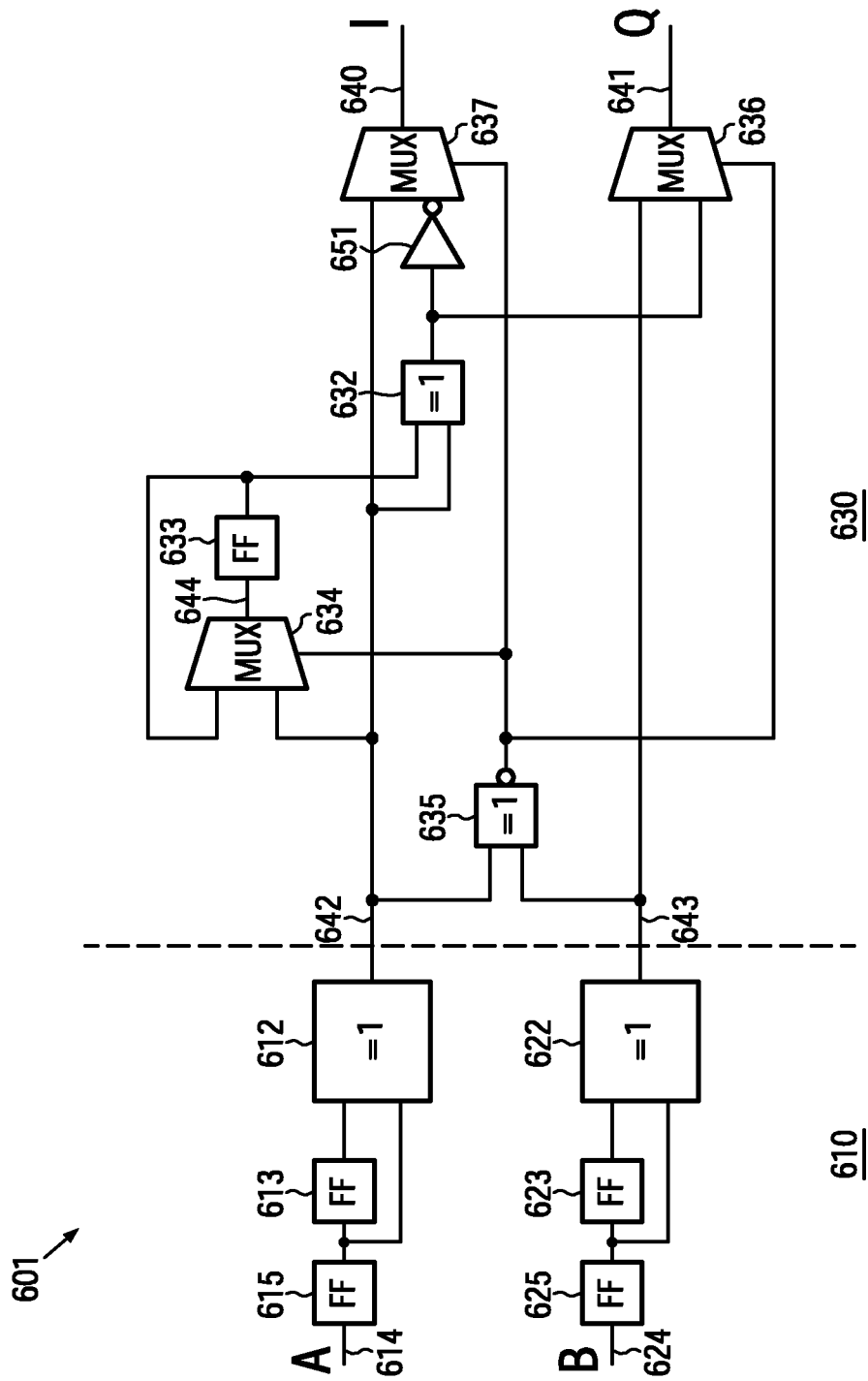
FIG. 6 shows a block diagram of a nested swap and invert-insensitive line decoder.

FIG. 6 shows the inversion decoder 610 and the swap decoder 630 in greater detail. The reference numbers of the corresponding elements in FIGS. 5 and 6 differ by 100. For each of the inputs 614 and 624 a decoder as shown in FIG. 1 is provided. Each of the decoders comprises a flip-flop 613 and 623, and an XOR gate 612 and 622. The flip-flop 615 and 625 are not necessary, but have a pulse-shaping functionality and consequently provide well-defined 0s or 1s to the following logic.

Within the swap decoder 630 an XOR gate 635 detects odd and even parity pairs at nodes 642 and 643. The XOR gate 635 outputs a logical 1, if an even parity pair is present at the nodes 642 and 643, since the output of XOR gate 635 is inverted. In this case, multiplexers 637 and 636 select their upper inputs and consequently output the signal at node 642 at the in-phase output 640 and the signal at node 643 at a quadrature output 641.

A flip-flop 633 stores the in-phase bit of the previous odd parity pair. If the XOR gate 635 detects an even parity pair at the nodes 642 and 643, the output of flip-flop 633 is sent back to the input of flip-flop 633 by multiplexer 634. The connector between the output of multiplexer 634 and the input of the flip-flop 633 is referred to as node 644. The flip-flop 633 does not change its status during one or more even parity pairs at the nodes 642 and 643. In another embodiment, the clock (not shown) of the bits to be transmitted could be disconnected from the flip-flop 633, when an even parity pair is detected at the nodes 642 and 643. This could be done by an OR or NOR gate which has two inputs and an output. One of the inputs is connected to the output of the XOR gate 635, the other input is connected to the clock. The clock input (not shown) of the flip-flop 633 is connected to the output of the OR or NOR gate. An OR or NOR gate is chosen depending on which clock slope the flip-flop 633 shifts data. In a further embodiment, the clock of flip-flop 633 could be disconnected by a switch or multiplexer, when an even parity pair is detected at the nodes 642 and 643.

An XOR gate 632 compares the in-phase bits of a present and previous odd parity pair. The result is output at the in-phase output 640 by the multiplexer 637 and the inverted result is output at the quadrature output 641 by the multiplexer 636. It is noted that the lower input of the multiplexer 637 is inverted by inverter 651.

Figure 7:
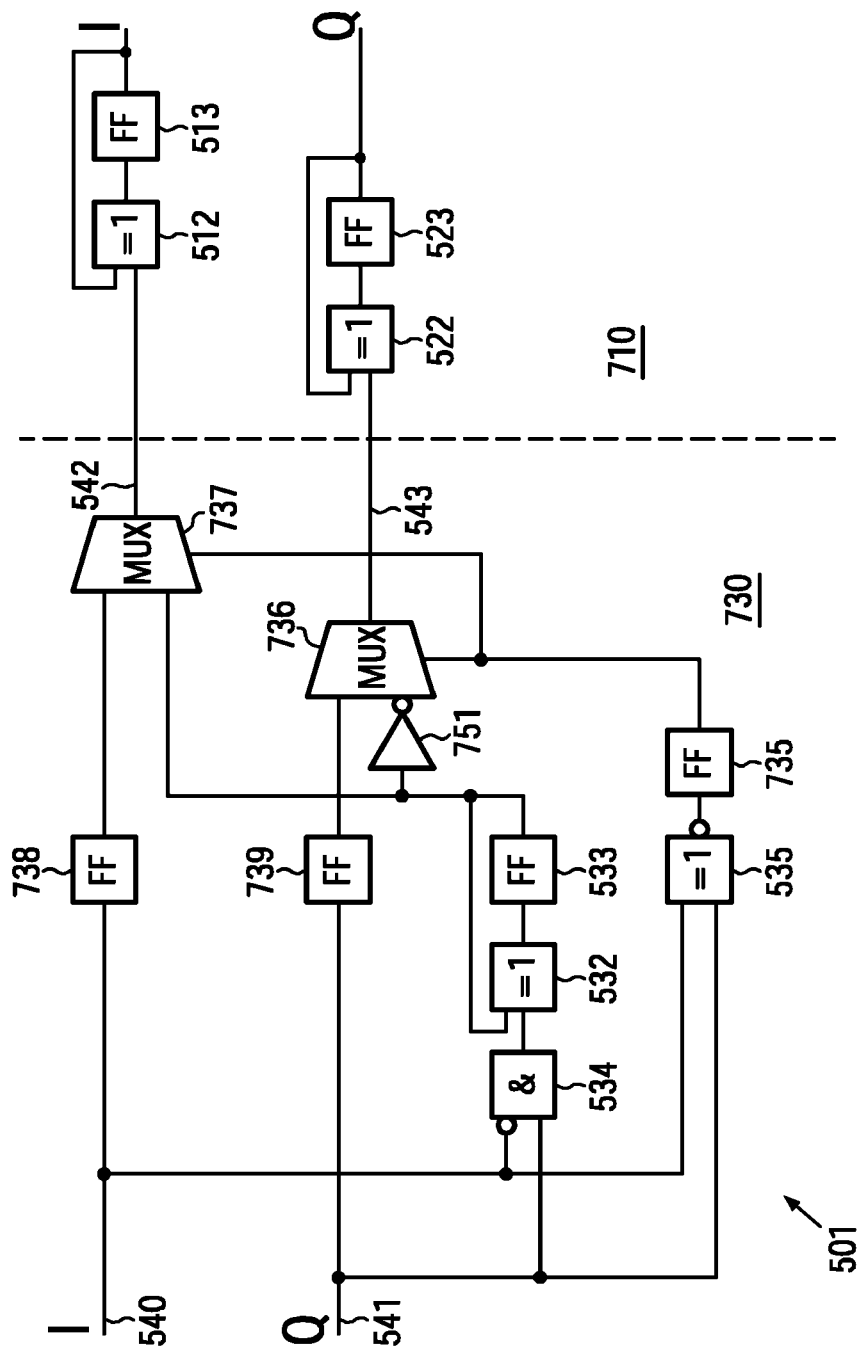
FIG. 7 shows a block diagram of a second embodiment of a nested swap and invert-insensitive line coder.

FIG. 7 shows a second embodiment of an inventive swap coder 730 and an inventive line coder 710. The swap coder 730 is very similar to the swap coder 530. Like parts are designated with the same reference numbers. One difference is that the output of the flip-flop 533, rather than the output of the XOR gate 532 is forwarded to the lower inputs of multiplexers 736 and 737. E.g. an implementation with the lower input of multiplexer 736 rather than the lower input of multiplexer 537 being inverted by inverter 751 provides an implementation equivalent with the two outputs being swapped.

In order to compensate the additional delay of flip-flop 533, flip-flops 738, 739 and 735 delay inputs 540 and 541 and the output of XOR gate 535.

The line coder 710 comprises two individual coders, each of which is identical to the coder within transmitter 11 shown in FIG. 1.

In the embodiments described above, any flip-flop may be replaced by an integer number of flip-flops. Care must be taken, that the numbers of corresponding flip-flops in the coder and corresponding decoder are equal. E.g. flip-flops 513 and 523 correspond to flip-flop 613 and 623—these four must all match to allow for channel swaps—and flip-flop 533 corresponds to flip-flop 633. Any flip-flop which generates a delay may be replaced by a delay line or another delay circuit which generates a delay equivalent to an integer number of a bit duration. As mentioned before, care must be taken, that the corresponding delays in the coder and decoder are equal.

It is generally known that high-speed electronic circuits are often implemented in a symmetrical fashion, in which a signal is carried by two, namely a positive and a negative line. The positive line carries the signal, whereas the negative line carries the inverted signal. It is well known that, in differential circuits, inverters may be implemented by crossing over the positive and negative line.

Further modifications and variations of the present invention will be apparent to those skilled in the art in view of this description. Accordingly, this description is to be construed as illustrative only and is for the purpose of teaching those skilled in the art the general manner of carrying out the present invention. It is to be understood that the forms of the invention shown and described herein are to be taken as the presently preferred embodiments.

| reference list | |
|---|---|
| 1 | invert-insensitive system |
| 2, 4, 5, 7 | data sequence |
| 3 | state |
| 6, 8 | inverted data sequence |
| 11 | transmitter |
| 12 | XOR gate |
| 13 | flip-flop |
| 21 | receiver |
| 22 | XOR gate |
| 23 | flip-flop |
| 31 | transmission path |
| 501 | transmitter |
| 510 | inversion coder |

-continued

| reference list | |
|---|---|
| 512, 522 | XOR gate |
| 513, 523 | flip-flop |
| 514 | in-phase output |
| 524 | quadrature output |
| 530 | swap coder |
| 532, 535 | XOR gate |
| 533 | flip-flop |
| 534 | AND gate |
| 536, 537 | multiplexer |
| 540 | in-phase input |
| 541 | quadrature input |
| 542 | in-phase node |
| 543 | quadrature node |
| 551 | inverter |
| 590 | transmission channel |
| 601 | receiver |
| 610 | inversion decoder |
| 612, 622 | XOR gate |
| 613, 615, 623, 625 | flip-flop |
| 614, 624 | input |
| 630 | swap decoder |
| 632, 635 | XOR gate |
| 633 | flip-flop |
| 634, 636, 637 | multiplexer |
| 640 | in-phase output |
| 641 | quadrature output |
| 642, 643, 644 | node |
| 651 | inverter |
| 710 | line coder |
| 730 | swap coder |
| 735 | flip-flop |
| 736, 737 | multiplexer |
| 738, 739 | flip-flop |
| 751 | inverter |

The invention claimed is:

1. A coding circuit for generating a swap tolerant code comprising:
a first input configured to receive a first stream of serial data comprising a single bit in each timeslot of a plurality of timeslots;
a second input configured to receive a second stream of serial data comprising a single bit in each timeslot of said plurality of timeslots;
an odd parity pair detector having a third and a fourth input, said third input being connected to said first input, said fourth input being connected to said second input, said odd parity pair detector configured to output an odd parity pair signal if the bits received at said first and second inputs have different logical values;
a memory being connected to said first and second inputs, said memory information on a previous odd parity pair; and
an output circuit being connected to said memory and said first and second inputs, said output circuit comprising a first and second output configured to output said previous odd parity pair, if said first input provides a logical 1 and said second input provides a logical 0 and said output circuit outputting the inverted previous odd parity pair, if said first input provides a logical 0 and said second input provides a logical 1.

2. The coding circuit of claim 1, wherein said output circuit comprises a first multiplexer, a second multiplexer and an odd parity pair regeneration circuit, said first multiplexer having a fifth and sixth input, a control input and said first output having a seventh and eighth input, a control input and said second output, said fifth input being connected to either one of the inputs, said seventh input being connected to either one of the inputs, said sixth and eighth inputs being connected to said odd parity pair regeneration circuit, said control inputs being connected with each other and an output of said odd parity pair detector, said odd parity pair regeneration circuit being connected to said memory in order to receive information on the previous odd parity pair, said first and second multiplexers configured to connect said fifth and seventh inputs with said first and second outputs, respectively, if said odd parity pair detector outputs an even parity pair signal, and said first and second multiplexers configured to connect said sixth and eighth inputs with said first and second outputs, respectively, if said odd parity pair detector outputs an odd parity pair signal.

3. The coding circuit of claim 1, further comprising an inversion detector, inputs of the inversion detector being connected to said first and second inputs for providing an inversion signal at a third output of said inversion detector, if said first input provides a logical 0 and said second input provides a logical 1, said third output being connected to said memory, said inversion signal causing said memory to change its state.

4. The coding circuit of claim 2, further comprising an XOR gate having a ninth and a tenth input and a fourth output, said ninth input being connected to a fifth output of said memory, said tenth input being connected to said third output, said fourth output being connected to an input of said memory; and
said odd parity pair regeneration circuit comprising an inverter, an input of said inverter being connected to said fourth output, an output of said inverter being connected to said sixth input, said eighth input being connected to said fourth output.

5. The coding circuit of claim 3, further comprising an XOR gate having a ninth and a tenth input and a fourth output, said ninth input being connected to a fifth output of said memory, said tenth input being connected to said output of said inversion detector, said fourth output being connected to an input of said memory;
said coding circuit further comprising a first delay circuit, an input of said first delay circuit being connected to said first input and an output of said first delay circuit being connected to said fifth input;
said coding circuit further comprising a second delay circuit, an input of said second delay circuit being connected to said second input and an output of said second delay circuit being connected to said seventh input; and
said odd parity pair regeneration circuit comprising an inverter, an input of said inverter being connected to said fifth output, an output of said inverter being connected to said eighth input, said sixth input being connected to said fifth output.

6. The coding circuit of claim 1, wherein said first output is connected to an input of a first coding circuit comprising:
an third XOR gate having a first input, a second input and an output, said first input of said third XOR gate constituting said input of said first coding circuit, said output of said third XOR gate configured to provide a first encoded stream of serial data; and
a third delay circuit having an input and an output, said input of said third delay circuit being electrically connected to said output of said third XOR gate, said output of said third delay circuit being electrically connected to said second input of said third XOR gate; said third delay circuit configured to delay the data provided at its input by an integer multiple of said timeslot, said output of said third delay circuit configured to provide a second encoded stream of serial data; and
wherein said second output is connected to an input of a second coding circuit comprising:

a fourth XOR gate having a first input, a second input and an output, said first input of said fourth XOR gate constituting said input of said second coding circuit, said output of said fourth XOR gate configured to provide a third encoded stream of serial data; and a fourth delay circuit having an input and an output, said input of said fourth delay circuit being electrically connected to said output of said fourth XOR gate, said output of said fourth delay circuit being electrically connected to said second input of said fourth XOR gate; said fourth delay circuit configured to delay the data provided at its input by an integer multiple of said timeslot, said output of said fourth delay circuit configured to provide a fourth encoded stream of serial data.

7. A decoding circuit for decoding a swap tolerant code comprising:

a first input configured to receive a first stream of coded, serial data comprising a single bit in each timeslot of a plurality of timeslots;

a second input configured to receive a second stream of coded, serial data comprising a single bit in each timeslot of said plurality of timeslots;

an odd parity pair detector having a third and a fourth input, said third input being connected to said first input, said fourth input being connected to said second input, said odd parity pair detector configured to output an odd parity pair signal, if the bits received at said first and second inputs have different logical values and consequently constitute a present odd parity pair;

a memory being connected to said first or second inputs, said memory configured to store information on a previous odd parity pair; and an output circuit being connected to said memory and said first and second inputs, said output circuit comprising a first and second outputs configured to output a first odd parity pair, if said first and second inputs provide the same odd parity pair as the one on which information is stored in said memory and said output circuit configured to output a second odd parity pair different from the first odd parity pair, if said first and second inputs provide a different odd parity pair than the one on which information is stored in said memory.

8. The decoding circuit of claim 7, wherein said output circuit comprises a first multiplexer, a second multiplexer and an odd parity pair regeneration circuit, said first multiplexer having a fifth and sixth input, a control input and said first output, said second multiplexer having a seventh and eighth input, a control input and said second output, said fifth input being connected to either of the inputs, said seventh input being connected to either of inputs, said sixth and eighth inputs being connected to said odd parity pair regeneration circuit, said odd parity pair regeneration circuit being connected to said memory and configured to receive information on the previous odd parity pair, said odd parity pair regeneration circuit being connected to said first or second inputs and configured to receive information on the present odd parity pair, said control inputs being connected with each other and an output of said odd parity pair detector, said first and second multiplexers configured to connect said fifth and seventh inputs with said first and second outputs, respectively, if said odd parity pair detector outputs an even parity pair signal, and said first and second multiplexers being configured to connect said sixth and eighth inputs with said first and second outputs, respectively, if said odd parity pair detector outputs an odd parity pair signal.

9. The decoding circuit of claim 8, further comprising an multiplexer having a ninth input, a tenth input and a third output, said tenth input being connected to said first or second inputs for receiving information on the present odd parity pair, said third output being connected with an input of said memory, said ninth input being connected with an output of said memory, said multiplexer further having an control input being connected to an output of said odd parity pair detector, said multiplexer configured to connect said tenth input to said third output, if said odd parity pair detector outputs said odd parity pair signal.

10. The decoding circuit of claim 9, said odd parity pair regeneration circuit further comprising:

an XOR gate having an eleventh and a twelfth input and a fourth output, said eleventh input being connected to an output of said memory, said twelfth input being connected to said first input or said input of said memory, said fourth output being connected to said sixth input; and an inverter, an input of said inverter being connected to said fourth output, an output of said inverter being connected to said sixth input.

11. The decoding circuit of claim 10, wherein said first input is connected to an output of a first decoding circuit comprising:

a third delay circuit having an input and an output; said input of said third delay circuit receiving a stream of serial, coded data comprising a single bit in a timeslot, said third delay circuit is configured to delay the data provided at its input by an integer multiple of said timeslot; and an third XOR gate having a first input, a second input and an output, said first input of said third XOR gate being electrically connected to said input of said third delay circuit, said second input of said third XOR gate being electrically connected to said output of said third delay circuit, said output of said third XOR gate constituting said output of said first decoding circuit; and wherein said second input is connected to an output of a second decoding circuit comprising:

a fourth delay circuit having an input and an output; said input of said fourth delay circuit configured to receive a stream of serial, coded data comprising a single bit in a timeslot, said fourth delay circuit configured to delay the data provided at its input by an integer multiple of said timeslot; and an fourth XOR gate having a first input, a second input and an output, said first input of said fourth XOR gate being electrically connected to said input of said fourth delay circuit, said second input of said fourth XOR gate being electrically connected to said output of said fourth delay circuit, said output of said fourth XOR gate constituting said output of said second decoding circuit.

12. A coding method for generating an swap tolerant code comprising:

receiving a first stream of serial data comprising a single bit in each timeslot of a plurality of timeslots at a first input;

receiving a second stream of serial data comprising a single bit in each timeslot of said plurality of timeslots at a second input;

detecting odd parity pairs at said first and second inputs and outputting an odd parity pair signal if the bits received at said first and second inputs have different logical values and consequently constitute a present odd parity pair;

storing information on a previous odd parity pair in a memory; and outputting said previous odd parity pair at first and second outputs outputs, if said first input provides a logical 1 and said second input provides a logical 0; and outputting the inverted previous odd parity pair at the first and second outputs outputs if said first input provides a logical 0 and said second input provides a logical 1.

13. A decoding method for decoding a swap tolerant code comprising:
  receiving a first stream of coded, serial data comprising a single bit in each timeslot of a plurality of timeslots at a first input;
  receiving a second stream of coded, serial data comprising a single bit in each timeslot of said plurality of timeslots at a second input;
  outputting an odd parity pair signal if the bits received at said first and second inputs have different logical values;
  storing information on a previous odd parity pair as the one in a memory; and
  outputting a first odd parity pair if said first and second inputs receive the same odd parity pair as the one on which information is stored in said memory;
  outputting a second odd parity pair different from the first odd parity pair if said first and second inputs provide a different odd parity pair than the one on which information is stored in said memory.

* * * * *